Nov. 16, 1954 V. O. GOUMENT 2,694,520
APPARATUS FOR SEPARATING BUTTERFAT FROM MILK
Filed Dec. 3, 1951 4 Sheets-Sheet 1

Nov. 16, 1954 V. O. GOUMENT 2,694,520
APPARATUS FOR SEPARATING BUTTERFAT FROM MILK
Filed Dec. 3, 1951 4 Sheets-Sheet 2

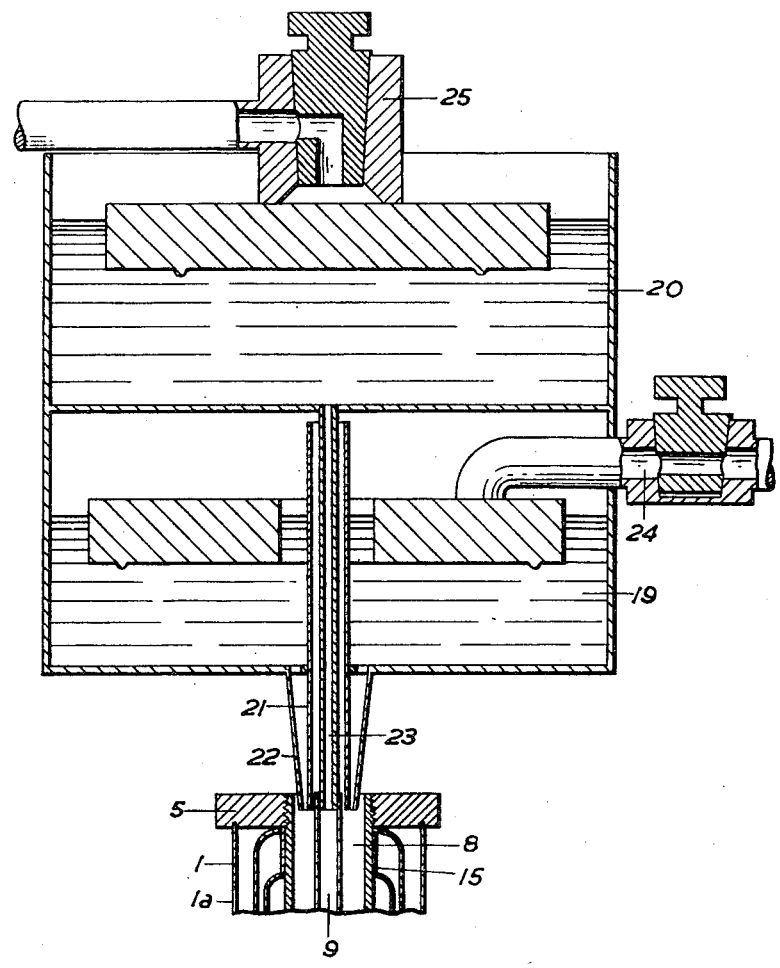

United States Patent Office 2,694,520
Patented Nov. 16, 1954

2,694,520

APPARATUS FOR SEPARATING BUTTERFAT FROM MILK

Vear Oliver Goument, Berwick-on-Tweed, England

Application December 3, 1951, Serial No. 259,679

4 Claims. (Cl. 233—12)

This invention consists in an improved method of and apparatus for separating butterfat from milk.

Cream as at present separated generally consists of a concentration of butterfat in milk of about 50%, with the result that, owing to the tendency to ripen, mature and finally putrify caused by the presence of the milk content it is not possible to keep the cream for any period in ordinary temperatures.

The object of the invention is to provide a method and apparatus for the separation of butterfat in which the separated butterfat is practically free from any other constituent apart from water. With such substantially complete isolation all tendency to ripen, mature or putrify is arrested, with the result that the suspension can be kept for a substantial period of time—a number of weeks—even under tropical conditions.

According to the invention the milk is subjected to separation action so that concentrated butterfat and some residual solids other than butterfat are separated from the skimmed milk, the separated butterfat and residual solids then being mixed with water, and this mixture subjected to centrifugal separation action into substantially butterfat and water on the one hand and water with residual solids on the other hand.

The apparatus for carrying out the process according to the invention may comprise two stage centrifugal separator means in the first stage portion of which the butterfat with some residual solids are passed into a separator chamber and separated from the skimmed milk which is discharged for collection, and the second stage portion of which comprises a mixing chamber in which the water and separated butterfat and other residual solids are mixed and then passed into a second separator chamber in which the butterfat substantially devoid of other solids, is once again separated out, and separate discharge means from which the butterfat in water suspension constituent on the one hand and the water and residual solids are discharged for collection.

The mixing chamber may be combined with the second separator; or it may be a separate tank which is adapted to receive the cream and water at one end, and at the other end deliver the diffused mixture to the second separator. According to another form the separator means may comprise two separator bowls and a mixing chamber combined to form a rigid structure adapted to rotate as a single unit. According to a still further form the separator means may consist in separate separators, each comprising a single separator bowl, which are driven by separate driving means; or they may be driven simultaneously from common driving means.

The invention will now be described by way of example with reference to the accompanying semi-diagrammatic drawings which show one form of separator bowl with the outer casing omitted in which two separators are combined in a single rigid structure.

In the said drawings:

Fig. 4 is a sectional view of the feed control to the separator.

Figure 1:
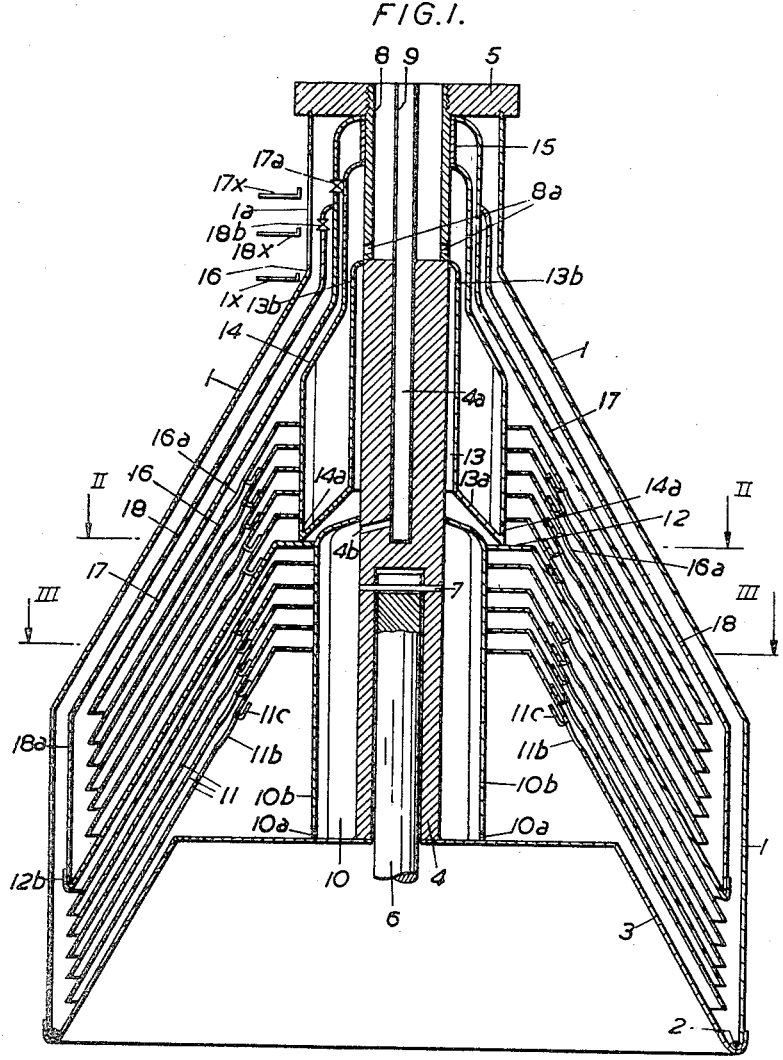
Fig. 1 is a vertical sectional elevation on the line I—I of Fig. 2.

Referring more particularly to the drawings, 1 is a conical bowl top which rests on a rubber ring 2 lying in a groove formed by the flanged edge of a bowl bottom 3, the two portions being held together by means of a central column 4 rigidly secured to the bottom 3, and threaded at its upper end to receive a large diameter nut 5 having an annular groove which receives the neck portion of the bowl top 1. An opening 1a is formed in the neck portion to allow of the discharge of the various constituents. This assembly forms the outer casing which holds together the rest of the parts constituting the separator bowl. The lower portion of the column 4 is bored to receive the driving spindle 6 of the separator driving mechanism (not shown), the upper end of the spindle 6 being slotted for engagement with a transverse pin 7 which transmits the drive to the column 4.

The upper end of the column 4 is constituted by a tubular portion 8 having discharge orifices on its lower end at 8a, and which is externally threaded to receive the nut 5. The upper portion of the column proper 4 is axially bored at 4a for about half its length, and has inserted in the bore 4a a central tube 9. The lower end of the bore 4a and tube 9 has a discharge port 4b leading to the upper end of a milk distributor 10 which is keyed to the column 4, and which has orifices 10a at its lower end. The milk is introduced to the separator through the tube 9.

Figure 3:
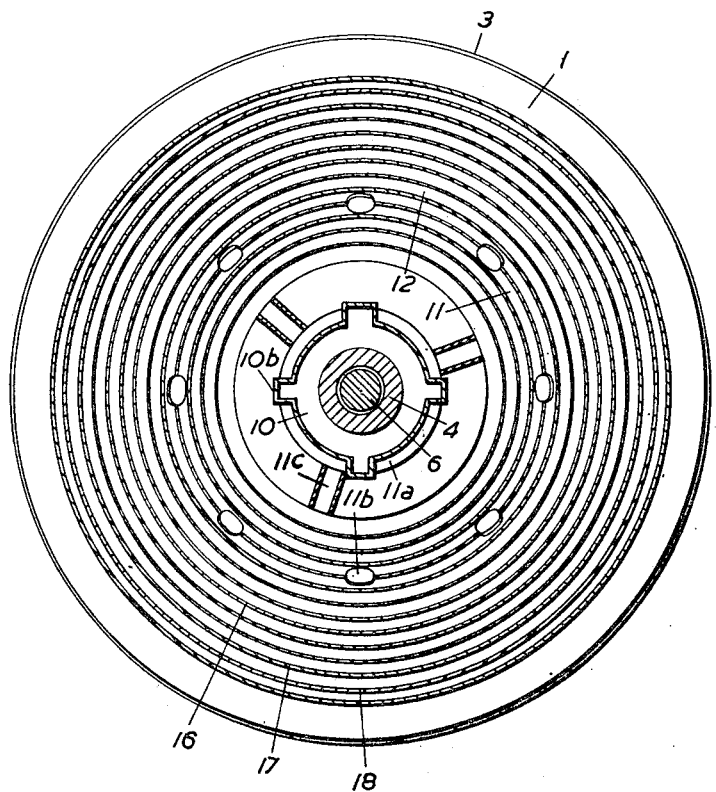
Fig. 3 is a section on the line III—III of Fig. 1.

Vertical splines or ridges 10b are formed on the distributor 10 to receive corresponding cut-out recesses in the necks—one being larger than the others—of a series of conical plates 11 of identical shape, so that they are interchangeable. The bore of the plates 11 is such that a small annular opening is left at 11a (Fig. 3) between them and the distributor 10 to enable cream to rise up along the distributor. About a third of the distance down the sloping sides of the plates 11 a series of equally spaced holes are formed at 11b. The plates 11 are spaced apart for example by means of the punched out and doubled over tongues 11c, which leave the holes 11b. In view of the identical form of the plates 11, the holes 11b coincide and thus are vertically above one another. A passage is thus provided through which milk can rise through the plates.

Figure 2:
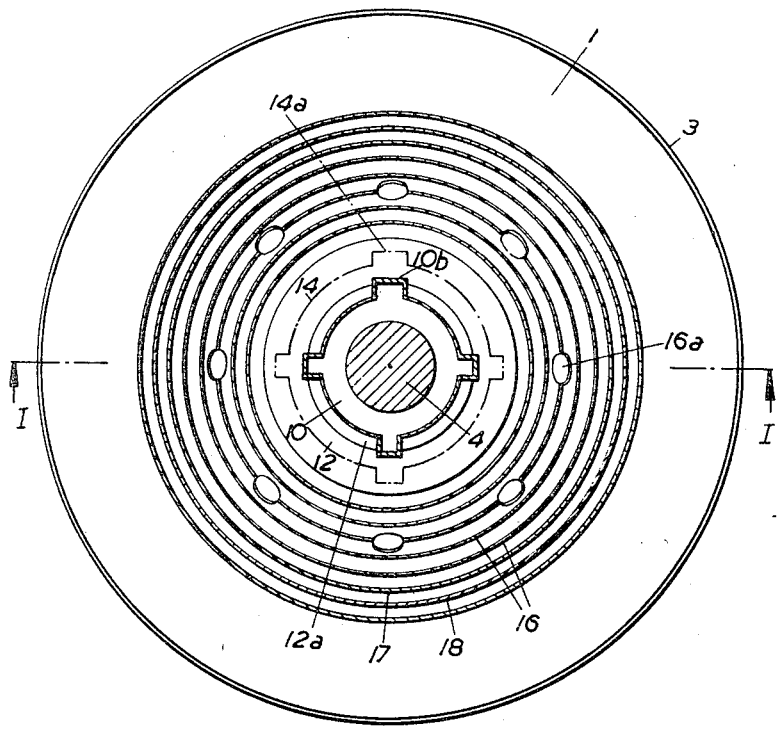
Fig. 2 is a section on the line II—II of Fig. 1.

Spaced above the plates 11 and also keyed to the distributor 10 is a collecting hood 12 which but for an annular cream outlet 12a (Fig. 2) is solid. It is provided with radial ribs on its sloping under side for spacing purposes. This hood completely isolates the above described first stage separator chamber from the second stage separator chamber now to be described.

Keyed to the column 4 is a cream collector 13, the lower portion of the collector being flared outwards at 13a to cover the cream outlets 12a and 11a in the in the hood 12 and plates 11. The collector 13 is held down by a bell-like member 14, whose inner surface with the outer surface of the cream collector 13 constitutes a mixing chamber. The upper end of the member 14 fits tightly around the upper end of the tube 8, and a distance piece 15 serves to maintain it pressed on the outer perimeter of the portion 13a. Adjustable jets 13b are screwed into the upper end of the collector 13 for discharging cream from the collector 13 into the mixing chamber; said jets 13b being of any desired form, and may comprise plugs or inserts (not shown) having orifices therethrough and which may be interchanged as desired or may comprise plugs with means for adjusting the sizes of the openings; while in the tube 8 openings are formed at 8a for the introduction of water into the mixing chamber. Openings are also formed all around at the lower end of the mixing chamber at 14a, for discharging the mixture.

The member 14 is splined to receive a series of conical plates 16 having holes 16a. These plates 16 are similar to the plates 11, except that their inner and outer diameters are of different sizes from those of the latter.

Over the plates 16 there is arranged a collecting hood 17 which is keyed to the tubular portion 8. This hood extends up to the nut 5 which abuts against it. At its upper end in its neck portion there is a discharge orifice at 17a for discharging into a collector 17x of usual form the suspension of butterfat in water—which travels up the underside of the hood 17. The orifice 17a is adjustable so that the percentage of butterfat in the suspension may be varied.

A further collecting hood 18 with spacing radial ridges on its under-side and topside is arranged over and keyed to the hood 17, its lower end terminating in a short cylindrical skirt 18a whose lowermost edge fits into a groove formed by the turned up flange 12b on the lower edge of the hood 12. The neck of the hood 18 makes a tight fit with the neck of the hood 17. The hood 18 forms with the hood 17 a passage for the discharge of water mixed with the solid residual constituents of the cream, other than butterfat, into a collecting cover 18x through the discharge orifice 18b. The hood 18 also forms with the casing 1 a passage for the discharge of skimmed milk which is finally discharged through the discharge orifice 1a into a collecting cover 1x.

The above assembly constitutes the separator bowl.

Arranged above the separator bowl is a partitioned container which is divided horizontally into two compartments, the lower—19—for the water, and the upper—20—for the milk. The water flows from the container 19 through an annular passage formed between two co-axial tubes 21, 22 into the annular passage formed between the tubes 8 and 9 of the separator; while the milk flows down a central tube 23 which passes down the tube 21 and discharges into the tube 9. The two compartments 19, 20 are respectively fed by float controlled cocks 24, 25.

In operation, the separator is set in motion, and the milk and water supplies are turned on at the cocks 24 and 25 respectively so that the desired amount of flow of milk and water is about equal. The milk flows down the tube 9 and enters the distributor 10 by the port 4b. From here milk spreads out over the floor of the bowl bottom 3 from the holes 10a at the lower end of the distributor 10, and rises through the holes 11b in the conical plates 11. At the same time the heavier skimmed milk tends to deviate outwards between the plates 11 and eventually discharges from their outer edges and proceeds up between the bowl top 1 and the collecting hood 18 to the outlet 1a and thence to the collecting cover 1x.

The butterfat, being the lighter, tends to pass inwards between the plates 11, and, owing to the regulation at the cream outlets 13b, it does so accompanied by sufficient milk to keep it fluid. The cream having arrived at the inner edges of the plates 11 passes upwards along the outside of the distributor 10 through the spaces 11a and 12a, and is eventually collected by the collector 13. From the collector 13 the cream is ejected from the cream holes 13b into the mixing chamber where it meets jets of water from the orifices 8a. The jets from the orifices 13b and 8a, impinge together on the member 14 to enable the cream and water to mingle evenly to produce a suspension.

The mixed water and cream now falls to the bottom of the mixing chamber by which time diffusion of the butterfat globules in the water is complete, and the mixture is discharged from the orifices 14a at the lower end of the member 14. Thence it works under the lower plate 16 until it arrives at the holes 16a provided for its upward passage. As it proceeds through these holes the water, carrying with it the bulk of the solid constituents of the milk originally present in the cream from the first stage, except the butterfat, deviates outwards between the plates 16, and having reached the outer edges of the plates proceeds upwards between the collecting hoods 17 and 18 to the discharge 18b from which it is ejected into a collecting cover 18x.

The butterfat together with sufficient water to render it liquid proceeds in between the plates 16 in an inward direction and rises through the annular spaces formed between the inner edges of the plates 16 and the member 14, whence it rises under the collecting hood 17 to the hole discharge orifice 17a from which it is ejected into a collecting cover 17x.

The roles of the upper and lower compartments are reversible, if such is preferred in the interests of design; or the double function in the bowl as described may be achieved by using either twin bowls on one separator, or two separators bracketed together, each with a single bowl. The first bowl carries out normal separation according to existing practice, and the second bowl after receiving suitable mixed water and cream, carries out the separation of butterfat from the bulk of the remaining solid constituents present in the cream.

If for any reason, such as lengthy storage of the suspension, it is desirable to remove the last traces of solids other than butterfat, a third separation or second dilution may be achieved by adding a third compartment to the separator bowl, the water supply to each of the two washing stages being supplied through the same tube with holes at different levels.

I claim:

1. An improved method of centrifugally separating butterfat from milk in separate stages, which comprises in the first stage in feeding the milk into a locus of centrifugal force and separating the butterfat and the residual milk solids from the skimmed milk; discharging the skimmed milk from the locus; adding water in the second stage to the mixture of separated butterfat residual and the milk solids which accompany the butterfat, and then separating the mixture by centrifugal separation in said second stage into butterfat in water suspension on the one hand, and water with the residual milk solids present after the first separation on the other hand; and finally discharging each suspension from the locus.

2. Centrifugal apparatus for separating butterfat from milk comprising, in combination, at least two centrifugal separator units; means for rotating said units; means for feeding milk into the first unit; means in the first unit for separating butterfat and residual milk solids from the skimmed milk; means in the second unit for separating a mixture of butterfat with residual milk solids and water into a suspension of butterfat in water, and into water with the residual milk solids present after the first separation; said first unit having a peripheral outlet for the removal of skimmed milk; a second outlet in the first unit for the evacuation of butterfat with residual solids into a mixing chamber disposed between the first and second units; means for introducing water into the said chamber; means for conveying butterfat with residual solids from the chamber to the second separator unit, and means for discharging water suspensions of butterfat, and water suspensions of residual solids, from the second separator unit.

3. Apparatus according to claim 2 wherein the centrifugal separator units are arranged in one machine having a single drive, the first unit separating butterfat with residual milk solids from the skimmed milk, and the second unit separating the butterfat suspension in water from the water carrying away the residual milk solids present with the butterfat after the first separation.

4. Centrifugal apparatus for separating butterfat from milk comprising, in combination, at least two centrifugal separator units; means for rotating said units; means in the first unit for separating butterfat and residual milk solids from skimmed milk; means in the second unit for separating a mixture of butterfat with residual milk solids and water into a suspension of butterfat in water, and into water with the residual milk solids present after the first separation; said first unit having a peripheral outlet for the removal of skimmed milk; a second outlet in the first unit for the evacuation of butterfat with residual solids into a mixing chamber disposed between the first and second units; means for conveying butterfat with residual solids from the chamber to the second separator unit, means for discharging water suspensions of butterfat, and water suspensions of residual solids, from the second separator unit; said apparatus including a two-compartment container, a float controlled cock in each container, said cocks being adapted for connection to a milk supply and water supply respectively; tube means for feeding the milk in the milk container to the first separator unit; and second tube means for feeding water in the water container to the mixing chamber.

References Cited in the file of this patent

UNITED STATES PATENTS

| Number | Name | Date |
|---|---|---|
| 1,269,254 | Brown | June 11, 1918 |
| 2,313,540 | Hall | Mar. 9, 1943 |